(12) United States Patent
Sui et al.

(10) Patent No.: US 7,663,608 B2
(45) Date of Patent: Feb. 16, 2010

(54) HANDWRITING INPUT APPARATUS

(75) Inventors: Shou-Ling Sui, Pa Te (TW); Chen-Hsien Liao, Taipei (TW)

(73) Assignee: AU Optronics Corp., Hsinchu (TW)

( * ) Notice: Subject to any disclaimer, the term of this patent is extended or adjusted under 35 U.S.C. 154(b) by 679 days.

(21) Appl. No.: 11/274,163

(22) Filed: Nov. 16, 2005

(65) Prior Publication Data

US 2006/0109260 A1    May 25, 2006

(30) Foreign Application Priority Data

Nov. 19, 2004   (TW) ............................... 93135681 A (51) Int. Cl.
*G06F 3/041* (2006.01)

(52) U.S. Cl. .................................... 345/173

(58) Field of Classification Search ................ 345/156, 345/57, 173; 382/313; 178/18.01, 18.03
See application file for complete search history.

(56) References Cited

U.S. PATENT DOCUMENTS

| | | | |
|---|---|---|---|
| 5,442,147 A * | 8/1995 | Burns et al. ............... | 178/18.09 |
| 5,852,434 A | 12/1998 | Sekendur .................... | 345/179 |
| 6,876,355 B1 * | 4/2005 | Ahn et al. ................... | 345/173 |
| 6,899,275 B2 * | 5/2005 | Schramm .................... | 235/487 |
| 2002/0031622 A1 * | 3/2002 | Ippel et al. .................. | 428/1.6 |
| 2003/0001825 A1 * | 1/2003 | Omura et al. ............... | 345/173 |
| 2003/0043157 A1 * | 3/2003 | Miles .......................... | 345/540 |
| 2004/0047505 A1 * | 3/2004 | Ghassabian ................. | 382/186 |
| 2004/0109997 A1 * | 6/2004 | Li et al. ....................... | 428/354 |
| 2004/0174324 A1 * | 9/2004 | Yamazaki et al. ........... | 345/76 |
| 2005/0006768 A1 * | 1/2005 | Narasimhan et al. ........ | 257/751 |
| 2007/0196034 A9 * | 8/2007 | Silverbrook et al. ........ | 382/313 |

FOREIGN PATENT DOCUMENTS

| | | |
|---|---|---|
| CN | 1150322 A | 5/1997 |
| CN | 1245944 | 3/2000 |
| CN | 2411767 | 12/2000 |
| TW | 578082 | 3/2004 |

* cited by examiner

*Primary Examiner*—Richard Hjerpe
*Assistant Examiner*—Shaheda A Abdin
(74) *Attorney, Agent, or Firm*—Thomas, Kayden, Horstemeyer & Risley (57) ABSTRACT

A handwriting input apparatus comprises a position-encoding layer and a pen. The position-encoding layer comprises a plurality of position-encoding pattern. The position-encoding layer is transparent to visible light and is reflective to light of predetermined wavelengths. Each position-encoding pattern represents a specific code. The pen has a projector and a camera at one end. The projector is adapted to generate a light beam of the predetermined wavelengths toward the position-encoding layer. The camera is adapted to capture images of the plurality of position-encoding pattern.

6 Claims, 6 Drawing Sheets

HANDWRITING INPUT APPARATUS

BACKGROUND OF THE INVENTION (1) Field of the Invention

The present invention generally relates to a handwriting input apparatus, particularly, to a handwriting input apparatus, which is applied on a display panel of an electronic device.

(2) Description of the Prior Art

With the development of science and technology, input apparatus of electronic devices becomes pluralistic. Besides the familiar keyboard and mouse, a touch panel or a handwriting input apparatus becomes much more popular than before. Recently, the touch panels are applied on display panels of electronic devices such as ATM (automatic tell machine), bill payment machine and bill inquiring machine. Through the touch panel, an user can directly touch a icon, a word or a sentence, which is displayed on the display panel, to complete his/her input selection. The handwriting input apparatus, which is also applied on a display panel of a electronic device, provides higher detecting speed and detection sensitivity than the touch panel. Thus, the handwriting input apparatus is applied in more complicated electronic device such as panel computer or PDA.

Because the handwriting input apparatus is jointed with the display panel, it needs less space than other traditional input apparatus such as keyboard. This makes electronic products as PDA or panel computer meet their portable requirement. Another advantage of handwriting input apparatus is that it provides a more friendly human/machine interface than other input apparatus.

Figure 1:
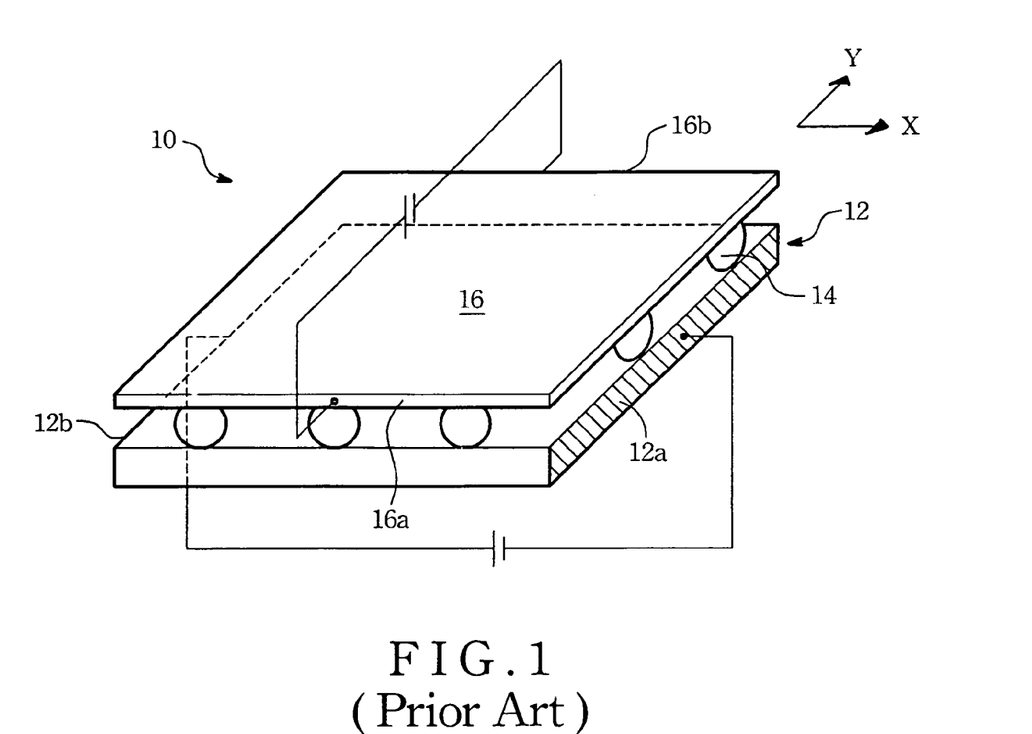
FIG. 1 shows a typical resistive touch panel.

Please refer to FIG. 1. FIG. 1 shows a typical resistive touch panel 10. The touch panel 10 is applied in an electronic device. The touch panel 10 comprises a conductive sheet 12, an elastic conductive film 16 and a spacer 14. The spacer 14 are placed between the conductive sheet 12 and the elastic conductive film 16 to separate the conductive sheet 12 and the elastic conductive film 16. Two opposite sides 12a, 12b of the conductive sheet 12 connect to two different voltage levels. Thus a voltage gradient, which is perpendicular to a Y-axis shown in FIG. 1, is formed on the conductive sheet 12.

Two opposite sides 16a, 16b of the elastic conductive film 16 connect to two different voltage levels. Thus a voltage gradient, which is perpendicular to a X-axis shown in FIG. 1, is formed on the elastic conductive film 16. While an user's finger exerts pressure on the elastic conductive film 16 to make the elastic conductive film 16 touch the conductive sheet 12. The distribution situations of the voltage levels on the conductive sheet 12 and the elastic conductive film 16 are changed. By measuring the changed voltage levels, a touched position of the finger is able to be detected. The drawbacks of the resistive touch panel 10 is the poor detecting speed that cannot meet the requirement of handwriting input.

Figure 2A:
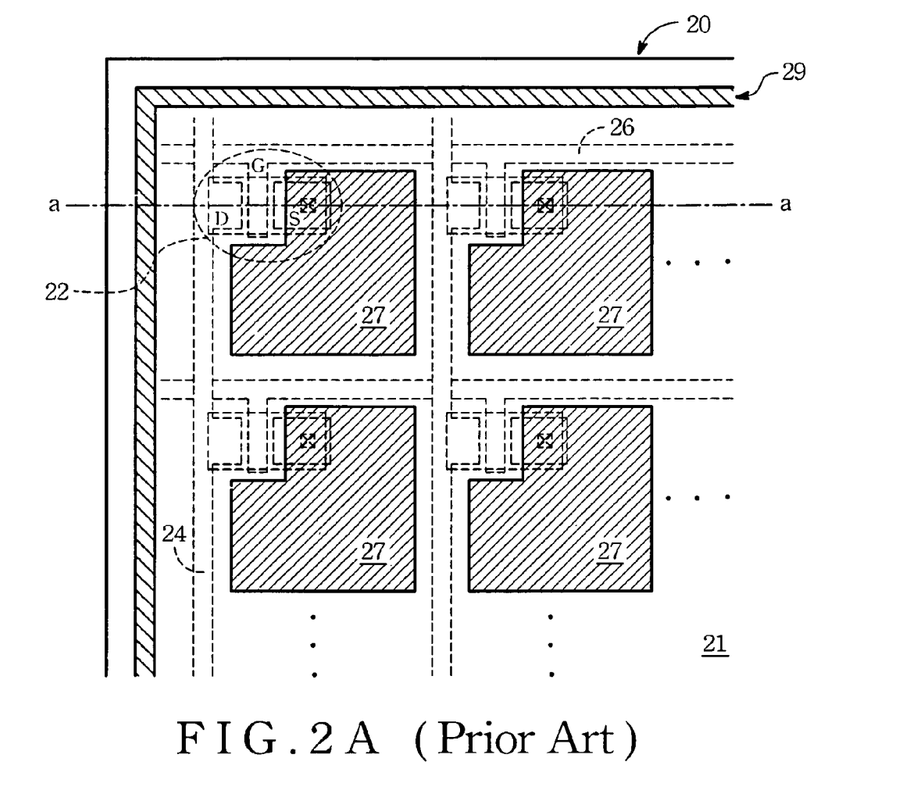
FIG. 2A is a top view of a handwriting panel.
Figure 2B:
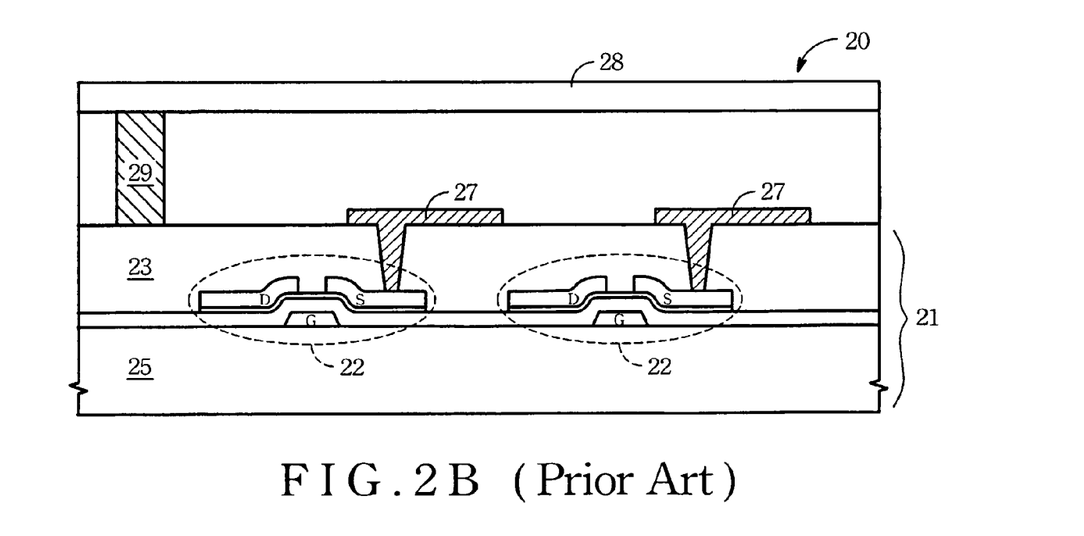
FIG. 2B is a cross section view along line a-a of the touch panel shown in FIG. 2A.

Please refer to FIG. 2A and FIG. 2B. FIG. 2A is a top view of a handwriting panel 20. FIG. 2B is a cross section view along line a-a of the touch panel 20 shown in FIG. 2A. The handwriting panel 20 comprises a thin-film transistors substrate 21, a plurality of conductive islet 27, an elastic conductive film 28 and a spacer 29.

As shown in FIG. 2A and FIG. 2B, the thin-film transistors substrate 21 comprises a substrate 25, a plurality of thin-film transistors 22 arranged as an array, a plurality of data lines 24, a plurality of scan lines 26, and a passivation layer 23. The plurality of data lines 24 disposed on the substrate 25 are arranged in a column direction; and the plurality of scan lines 26, which are also disposed on the substrate 25, are arranged in a row direction. The substrate 25 is divided into several compartments by the data lines 24 and the scan lines 26. Each of the thin-film transistor 22 is located in each compartment respectively. The drain of the thin-film transistor 22 electrically connects to the data line 24. The gate of the thin-film transistor 22 electrically connects to the scan line 24. The passivation layer 23 is disposed on the substrate 25 for protecting the plurality of thin-film transistors 21, the plurality of scan lines 26 and the plurality of data lines 24.

A plurality of conductive islets 27 are formed on the surface of the thin-film transistors substrate 21. Each of the conductive islets 27 electrically connects to the source of one thin-film transistor 22 through a through hole within the passivation layer 23. The spacer 29 is needed for separating the plurality of conductive islets 27 with the elastic conductive film 28. As shown in FIG. 2B, the spacer 29 is disposed on the thin-film transistors substrate 21; and it is located on the margin area of the thin-film transistors substrate 21 as shown in FIG. 2A.

While an user exerts pressure on the handwriting panel 20, with a finger or a touch pen, to make a portion of the elastic conductive film 28 touch with one or several conductive islets 27, at least one electrical signal is produced through the conduction of the elastic conductive film 28 and the corresponding touched conductive islet 27. The produced electrical signal is transferred to the source of the thin-film transistor 27. The produced electrical signal is scanned through each data line 24 sequentially by switching the gates, which are operated by the plurality of scan lines 26. By these, the touched position is detected by the produced electrical signal.

The scan and detecting speed of the handwriting panel 20 is fast enough for handwriting input. For example, under a scan frequency of 60 Hz, it only takes 16 milliseconds to complete a scan over the whole handwriting panel 20. Utilizing the integrated circuit and semiconductor producing technology, a thin-film transistors substrate 21 with high integration density is available. Thus, the handwriting panel 20 is able to meet the requirement of handwriting input.

However, the thin-film transistors substrate 21 within the handwriting panel 20 is very similar to one of the substrates of the LCD (liquid crystal display) panel, which comprises a plurality of thin-film transistors and relatively costs much. Besides the disadvantage of relatively high cost, the handwriting panel 20 also has a drawback of poor transmittance. This drawback counts in the situation that the handwriting panel 20 is applied on a display panel. Take the LCD panel for instance, if the handwriting panel 20 is disposed on the LCD panel, the light from a backlight source has to transmitted through a bottom substrate of LCD, which is very similar to the thin-film transistors substrate 21, a upper substrate of LCD, which is usually a color filter glass, and the handwriting panel 20 so as to reach the user's eye. Therefore, the handwriting panel 20, which has a complicated structure, might reduce the brightness of the display panel and disadvantage the image uniformity.

Another drawback of the prior handwriting panel 20 is the supporting ability. The elastic conductive film 28 is supported by the spacer 29. But the spacer 29 is generally disposed only on the margin area of the thin-film transistors substrate 21. Hence, the major portion of the elastic conductive film 28 is unsupported. Besides, the elastic conductive film 28 is usually made from elastic materials such as PET, PMMA, PC or PE, which are not easy to control its flatness while manufacturing.

Furthermore, after repeatedly use, the material intensity of the elastic conductive film 28 would decrease, or the material would become tired. While the tired elastic conductive film 28 is not able to be separated from the below conductive islet 27, the handwriting panel 20 will totally lost its function. The same drawback also appears in the touch panel 10 illustrated with FIG. 1.

As described above, while the handwriting input apparatus become important in many kinds of electrical device for obtaining a more friendly human/machine interface and for space-saving for the electrical device, the technique how to develop a handwriting input apparatus without the previously described disadvantages is now an important issue in the art.

SUMMARY OF THE INVENTION

One objective of the present invention is to provide a handwriting input apparatus having high detecting resolution and speed.

Another objective of the present invention is to provide a hand writing input apparatus capable of applying in a electronic device comprising display panel.

Another objective of the present invention is to provide a hand writing input apparatus which has a solid structure.

Another objective of the present invention is to provide a hand writing input apparatus which has a long product life time.

Another objective of the present invention is to provide a more economic hand writing input apparatus.

A handwriting input apparatus comprising a position-encoding layer and a pen is provided. The position-encoding layer comprises a plurality of position-encoding pattern. The position-encoding layer is transparent to visible light and reflective to light of predetermined wavelengths. Each position-encoding pattern represents a specific code. The pen includes a projector and a camera at one end. The projector generates a light beam of the predetermined wavelengths toward the position-encoding layer. The camera capturing images of the plurality of position-encoding patterns.

The advantage and spirit of the invention may be understood by the following recitations together with the appended drawings.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 3:
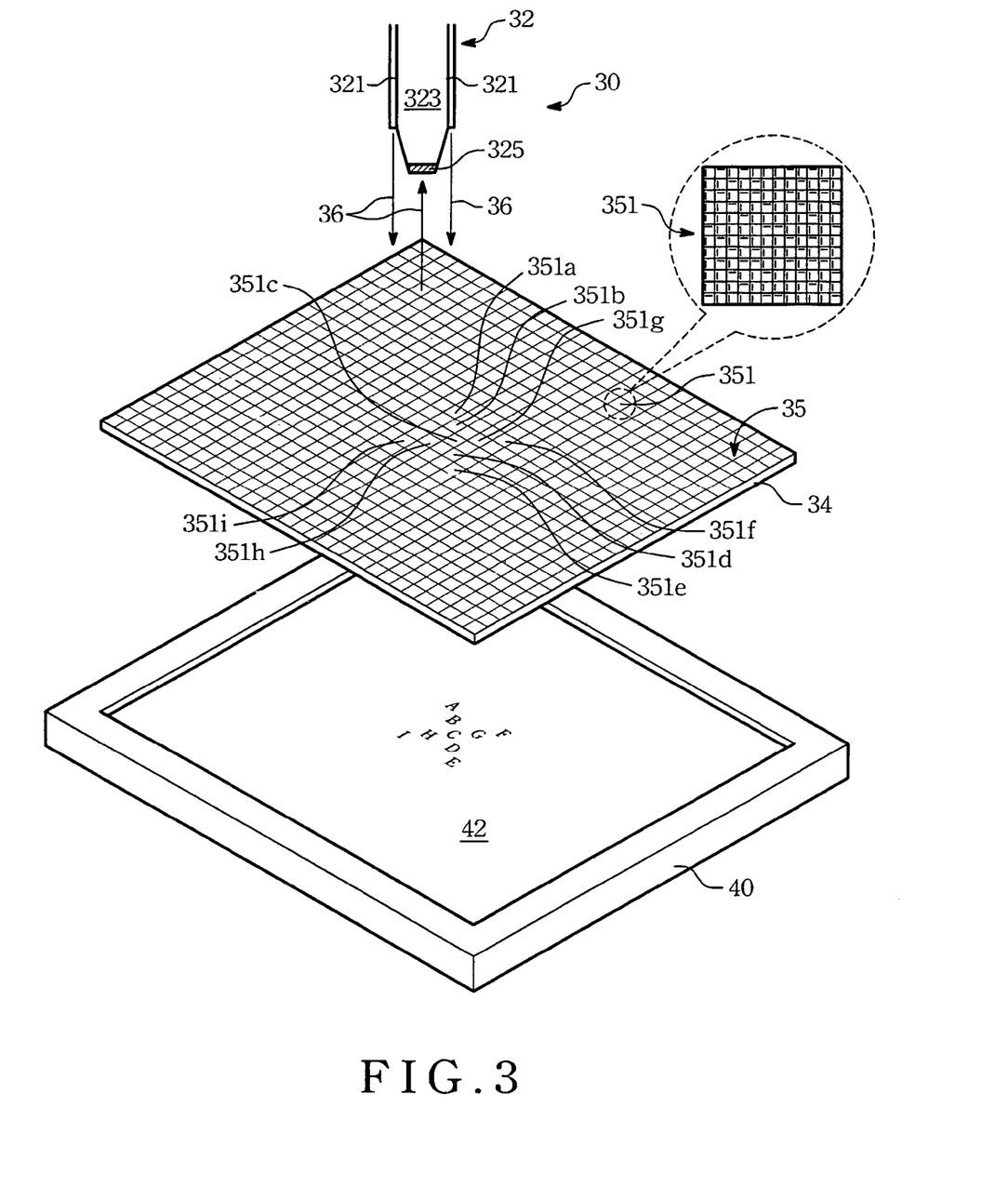
FIG. 3 shows a handwriting input apparatus according to the present invention.

Please refer to FIG. 3. FIG. 3 shows a handwriting input apparatus 30 according to the present invention. The handwriting input apparatus 30 is able to be applied on a display panel 42 of an electrical device 40 such as panel computer, PDA (personal data assistant), ATM (automatic tell machine), bill payment machine, bill inquiring machine and etc. The handwriting input apparatus 30 comprises a pen 32 and a position-encoding layer 35. In one embodiment, the position-encoding layer 35 is disposed on a transparent substrate 34 such as glass panel or plastic panel. In the other embodiments, which are not shown by FIG. 3, the position-encoding layer 35 is directly disposed on the surface of the display panel 42, or it is directly disposed within the display panel 42.

The pen 32 has a projector 321 and a camera 323 at one end of the pen 32. The projector 321 generates a light beam 36 toward the position-encoding layer 35. The light beam 36 has predetermined wavelengths. In one embodiment of the present invention, the light beam 36 is infrared ray. Accordingly, the predetermined wavelengths are ranging from about 800 nm to about 1300 nm.

The position-encoding layer 35 is transparent to visible light, which is generally ranging from about 400 nm to about 700 nm. Another property of the position-encoding layer 35 is that it is reflective to infrared ray—light of said predetermined wavelengths, which is ranging from about 800 nm to about 1300 nm. The position-encoding layer 35 comprises a plurality of position-encoding pattern 351. Each position-encoding pattern 351 represents a specific code for specifying the position of the corresponding position-encoding patter 351 among the whole position-encoding layer 35.

The camera 323 of the pen 32 is capable of taking pictures, which are spread by light of said predetermined wavelengths. It means, in one embodiment of the present invention, the camera 323 is capable of taking pictures propagated by infrared rays. A CCD (charged coupled diode) device is adopted for the camera 323 in some embodiments of the present invention, a CMOS (complementary metal-oxide semiconductor) device is adopted for the camera 323 in other embodiments. In preferred embodiments, it is better for the camera 323 to have the ability to record images' information in digital type. In some embodiments, the pen 32 further comprises a filter 325 disposed at the same end of the pen 32, where the projector 321 and the camera 323 are disposed. The filter 325 is adapted to block light other than the mentioned predetermined wavelengths, which do not belong to the predetermined wavelengths ranging from about 800 nm to about 1300 nm, so as to ensure that no interference with the camera 323.

While an user utilizes the pen 32 to write on the position-encoding layer 35, the light beam 36 generated by the projector 321 is reflected by the individual position-encoding pattern 351 and is captured by the camera 323. Hence, the positions that the pen 32 has passed by are able to be obtained according to those passed position-encoding patterns 351. A symbol, a character, a word or a drawing is thus distinguishable through further computer processing.

For example, as shown in FIG. 3, while an user utilizes the pen 32 to write the character "X" on the position-encoding layer 35, the pen 32 passes through the positions A, B, C, D and E (shown on the display panel 42) in order for the first stroke. Mean while, the handwriting input apparatus 30 detects these positions by the sequentially captured position-encoding patterns 351a, 351b, 351c, 351d and 351e. Similarly, for the second stroke of the character "X", the position-encoding patterns 351f, 351g, 351c, 351h and 351i are captured, and the passed positions F, G, C, H and I are detected.

In one embodiment of the present invention, each position-encoding pattern 351 is a different 2-D (two dimensional) barcode. As shown in FIG. 3, the 12×12 mosaic can represent 16,777,216 different kinds of 2-D barcodes. The major advantage of 2-D barcode is its high resolution, and of course, its capability of representing different code.

Figure 4:
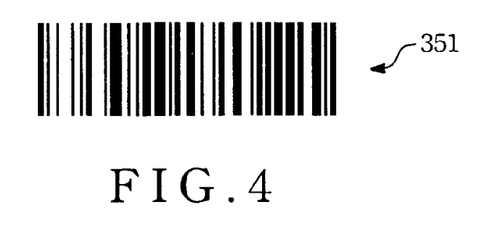
FIG. 4 shows a 1-D barcode.

In another embodiment, a 1-D barcode shown in FIG. 4 for example is adopted for the position-encoding pattern 351 to replace the 2-D barcode shown in FIG. 3. The 1-D barcode is very common and is usually printed on various kinds of product such as book, package of food and beverage, or on ID, document, license etc. to provide a machine-readable symbol, which usually represents a specific serial number. In the present invention, the requirement to the 1-D barcodes adopted in the position-encoding layer 35 is that every 1-D barcode must be unique in the position-encoding layer 35.

Figure 5:
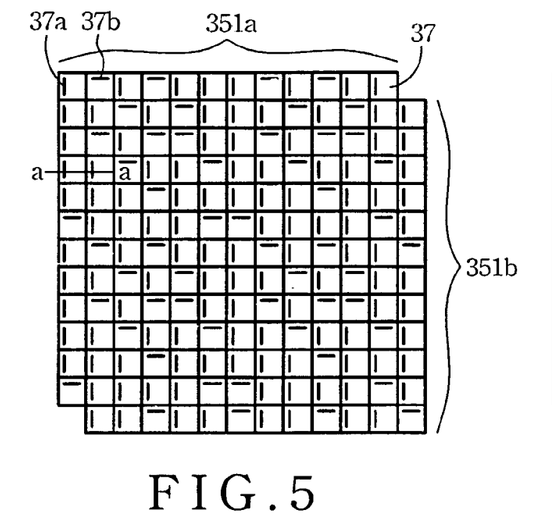
FIG. 5 shows details of two 2-D barcodes in FIG. 3.
Figure 6:
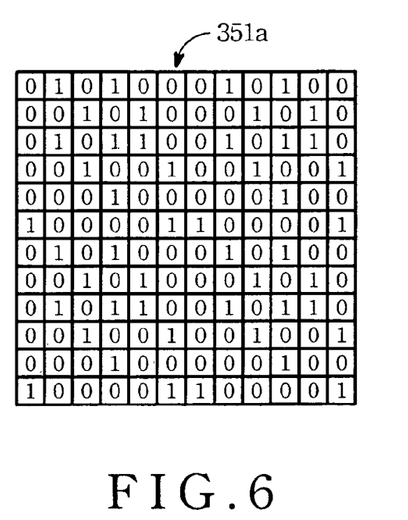
FIG. 6 shows the meaning of one of the two 2-D barcodes in FIG. 5.

The embodiment of utilizing 2-D barcode for the position-encoding pattern 351 is further explained with FIG. 5. As the same requirement as the application of 1-D barcode, every 2-D barcode in one position-encoding layer 35 must be unique. Take the position-encoding pattern 351a for example, it is in a mosaic form comprising a hundred and forty-four (twelve multiply twelve) blocks 37. Each block 37 may comprises a longitude bar 37a or a latitude bar 37b, which represents "zero" or "one" of the binary system respectively. Hence, the position-encoding pattern 351a represents a matrix shown in FIG. 6. In practice, through the camera 323 that records images' information in digital type and the 2-D barcode that represents information in "zero" and "one", which directly conforms the digital computing system, the decoding process is able to reach a remarkable computing speed.

As mentioned before, the 12×12 mosaic can represent 16,777,216 different kinds of 2-D barcodes. In another embodiment of the present invention, each position-encoding pattern 351 is a 16×16 mosaic, which is able to represent 268,435,456 different kinds of 2-D barcodes. This amount of 2-D barcodes is capable of applying for a large sized display panel with a panel size over 42" (42 inches in the diagonal line), and remaining high resolution as well.

A very convenient characteristic of the 2-D barcode is its remaining resolution even if enlarging the mosaic's scale. In the situation that having the same sized block 37, a 12×12 position-encoding pattern 351a (as shown in FIG. 5) and a 16×16 position-encoding pattern (not shown) have the same resolution for detecting. This characteristic is illustrated with the two position-encoding patterns 351a and 351b shown in FIG. 5, for example. These two position-encoding patterns 351a and 351b are partially overlapped with each other. A pen 32, which is originally located at a position corresponding to the position-encoding pattern 351a, can capture the position-encoding pattern 351b only by shifting right for one block 37 and shifting down for one block 37, from the original position. Hence, the resolution is corresponding to the size of the block 37, not the whole size of the position-encoding patterns 351. As the same function, in a position-encoding layer 35 comprising 16×16 position-encoding patterns, the resolution is also corresponding to the size of the block 37.

Please refer to FIG. 3. As mentioned above, the present handwriting input apparatus 30 is applied on the display panel 42 of the electrical device 40. The display panel 42 is a device that generates light. Therefore, how to avoid the light from the display panel 42 interfering with the camera 323 taking the pictures of the individual position-encoding pattern 351 is an important concern of the present invention.

Experiments show that even if the pen 32 does not comprises the filter 325, the camera 323 is able to take clear pictures of the position-encoding patterns 351 because that a light path between the pen 32 and the position-encoding layer 35 is not a long distance. In one embodiment, enhancing the intensity of the light beam 36 generated by the projector 32 is able to get a more clear picture. In the embodiment that disposing the filter 325 on the surface of the camera 323, light of the other wavelengths, which are not belonging to the infrared rays is therefore filtered out. It can efficiently avoid the interference from the mass visible light generated by the display panel 42. Hence, the detection sensibility of the handwriting input apparatus 30 is improved.

In the other hand, how to avoid the position-encoding layer 35 lowering the display quality of the display panel 42 is another important concern of the present invention. No matter the position-encoding layer 35 is disposed on the transparent substrate 34 as shown in FIG. 3, disposed on the surface of the display panel 42, or disposed within the display panel 42, the light generated from the display panel 42 has to pass through the position-encoding layer 35 to reach an user's eyes. Therefore, the position-encoding layer 35 is transparent to visible light, which is generally ranging from about 400 nm to about 700 nm. Another property of the position-encoding layer 35 is that it is reflective to infrared ray—light of said predetermined wavelengths, which is ranging from about 800 nm to about 1300 nm.

Figure 7:
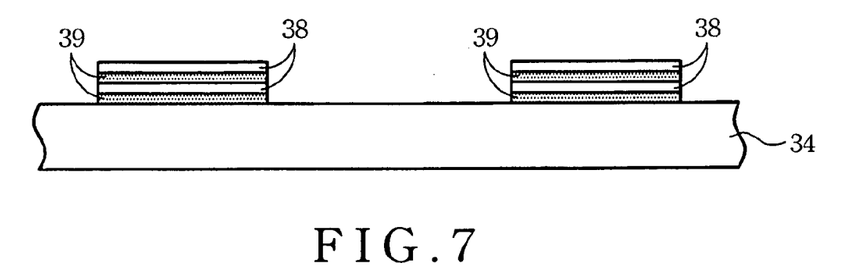
FIG. 7 shows a cross section view according to the a-a cross section line of FIG. 5.

Please refer to FIG. 7. FIG. 7 is a cross section view according to the a-a cross section line shown in FIG. 5. For providing the position-encoding layer 35 being transparent to visible light and reflective to infrared rays, the position-encoding layer 35 comprises a multi-layer structure, which comprises alternate low-refractive-index layers 38 and high-refractive-index layers 39. This multi-layer structure comprising alternate layers of different refractive-index can meet the requirement of the present invention. In some embodiments, the low-refractive-index layers 38 comprises SiO2. The high-refractive-index layers 39 comprises TiO2 or Mb2O5. The forming method for these low-refractive-index layers 38 and high-refractive-index layers 39 is sputtering. In the other embodiments, the low-refractive-index layers 38 and the high-refractive-index layers 39 are made from the same material. Utilizing different sputtering conditions, layers of different refractive-index, which are made from the same material but have different densities, are able to be formed within the multi-layer structure.

According to a plurality of experiments and embodiments according to the present invention, the multi-layer structure of the position-encoding layer 35 has three to ten layers are preferred conditions. An applicable thickness of the position-encoding layer 35 is ranging from about 200 nm to about 1500 nm, while a thickness ranging from about 400 nm to about 800 nm is preferable.

Figure 8:
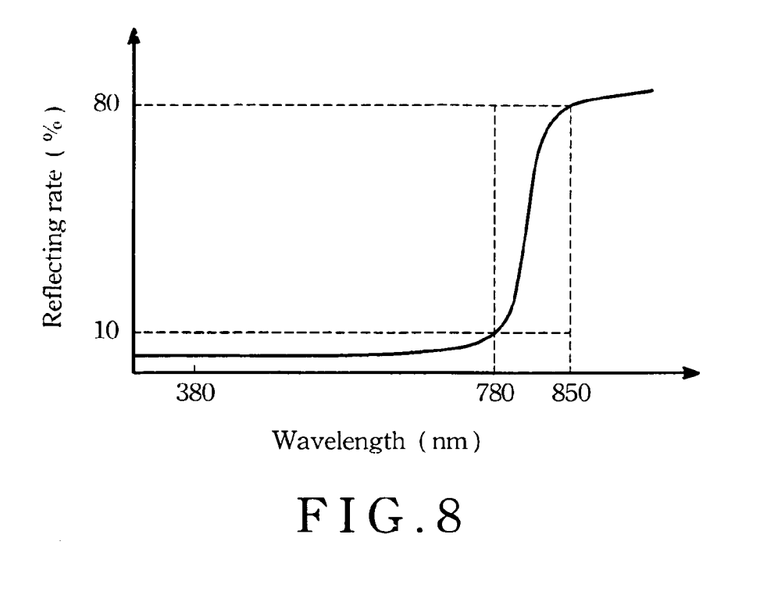
FIG. 8 is a wavelength-reflecting rate diagram.

Please refer to FIG. 8. FIG. 8 is a wavelength-reflecting rate diagram. The property of the above mentioned position-encoding layer 35, which comprises multi-layer structure, is illustrated with this diagram. In the wavelength scope that below 780 nm, the light reflecting rate is under 10%. Between the wavelength of 780 nm to 850 nm, the light reflecting rate grows progressively. In the wavelength scope that higher than 850 nm, the light reflecting rate is over 80%. In the scope of visible light, which has wavelengths between 400 nm to 700 nm, the position-encoding layer 35 has a low reflecting rate (below 10% as shown in FIG. 8) to these visible lights, and it also has a transmittance rate over 80% to light of the same scope.

Another important concern of the present invention is the tilt angle of the pen 32. This concern is for ensuring the present handwriting input apparatus 30 is workable for different users. Different users might have different ways of holding the pen 32, hence the tilt angel of the pen 32 depends on these different users. But very few users hold the pen 32 in a tilt angle that substantially perpendicular to the position-encoding layer 35. The pen 32 is usually worked in a "tilt" situation. Thus, if the surface of the position-encoding layer 35 is too flat or too smooth, the light beam 36 from the tilt pen 32 would reflect away from the pen 32. In this situation, the camera 323 is hard to capture images of the position-encoding patterns that the pen 32 passed by.

Concerning to the "tilt" pen 32, the position-encoding layer 35 has a roughness surface to overcome the mentioned problem. The roughness surface is for refraction-reflecting light. By the roughness surface of the position-encoding layer 35, the light beam 36 would reflect at the position-encoding layer 35 not only through a single direction, but through a plurality of directions so as to propagate the image of the position-encoding patterns to the camera 323. In one embodiment, the roughness surface of the position-encoding layer 35 is formed by pre-forming a roughness surface on the transparent substrate 34. Therefore, the position-encoding layer 35 formed by following sputtering on the transparent substrate 34 would have the roughness surface.

As shown in FIG. 3, the transparent substrate 34 is disposed on the display panel 42 such as LCD, OLED panel, PDP panel or CRT display. The embodiment of disposing the position-encoding layer 35 on the transparent substrate 34 has a major advantage that it is convenient for fabrication. By the transparent substrate 34, the handwriting input apparatus 30 is very easy to embed in many kinds of electrical device 40. The transparent substrate 34 may include glass, PVE, PE, organic materials or inorganic materials such as wafer, which contains Si.

Figure 9:
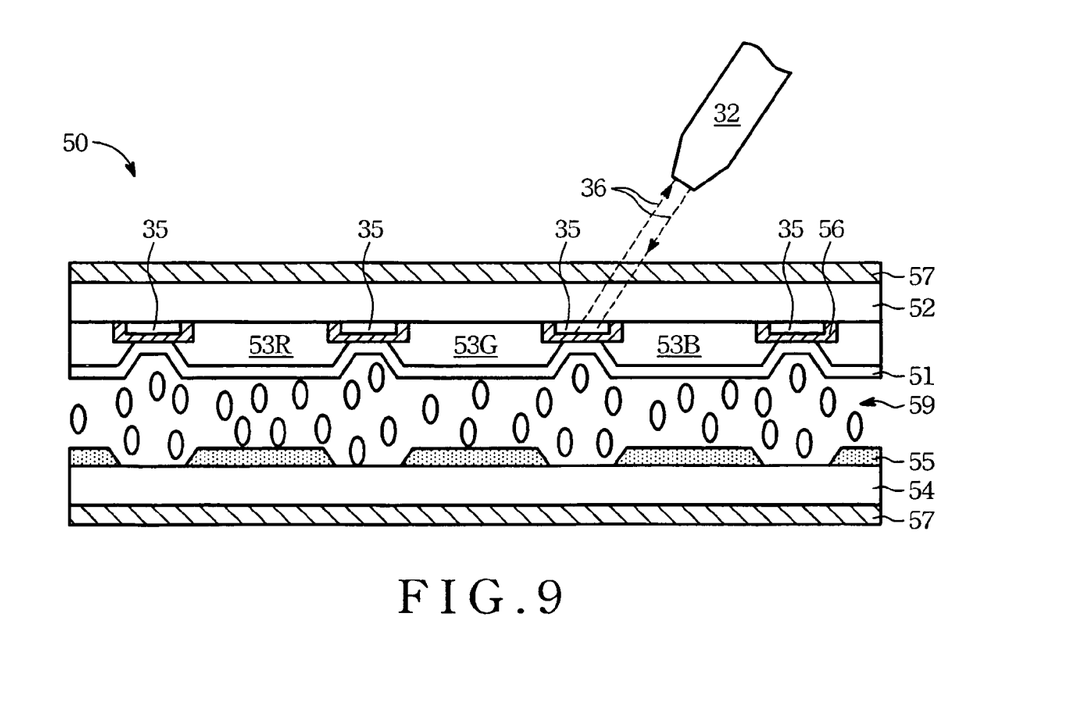
FIG. 9 shows a cross section view of a handwriting input apparatus according to one present embodiment, wherein the handwriting input apparatus is jointed with a LCD.

In other embodiments, the position-encoding layer 35 is disposed within a display panel 50, as shown in FIG. 9. The display panel 50 is a type of LCD comprising a first substrate 52, a second substrate 54 and a liquid crystal layer 59 between the first substrate 52 and the second substrate 54. Polarizers 57 are disposed on a top surface of the first substrate 52 and a bottom surface of the second substrate 54 respectively.

A black matrix 56 and a color filter layer 53 are formed on a bottom surface of the first substrate 52. The black matrix serves as a partition between a red filter 53R, a green filter 53G and a blue filter 53B of the color filter layer 53. A common electrode 51 is disposed below the black matrix 56 and the color filter layer 53. The common electrode 51, which includes ITO or/and IZO, is conductive to electrical current and transparent to light.

The second substrate 54 comprises a plurality of thin-film transistors (not shown) and a plurality of pixel electrodes 55 disposed correspondingly to each thin-film transistors respectively. The pixel electrodes 55 are disposed on a top surface of the second substrate 54 and arranged as an array. As shown in FIG. 9, the position of each pixel electrodes 55 is also underneath one of the red filters 53R, the green filters 53G or the blue filters 53B, respectively.

In the embodiment illustrated with FIG. 9, the position-encoding layer 35 is disposed on the bottom surface of the first substrate 52, where is within the display panel 50. The position-encoding layer 35 is only disposed in a predetermined area within the black matrix 56 for maintaining a display quality of the display panel 50. As the concern mentioned before that the pen 32 is usually used in a tilt angle, the bottom surface of the first substrate 52 is pre-processed to form a roughness surface for the position-encoding layer 35. In one embodiments, the roughness surface is only formed in the predetermined area within the black matrix 56.

Figure 10:
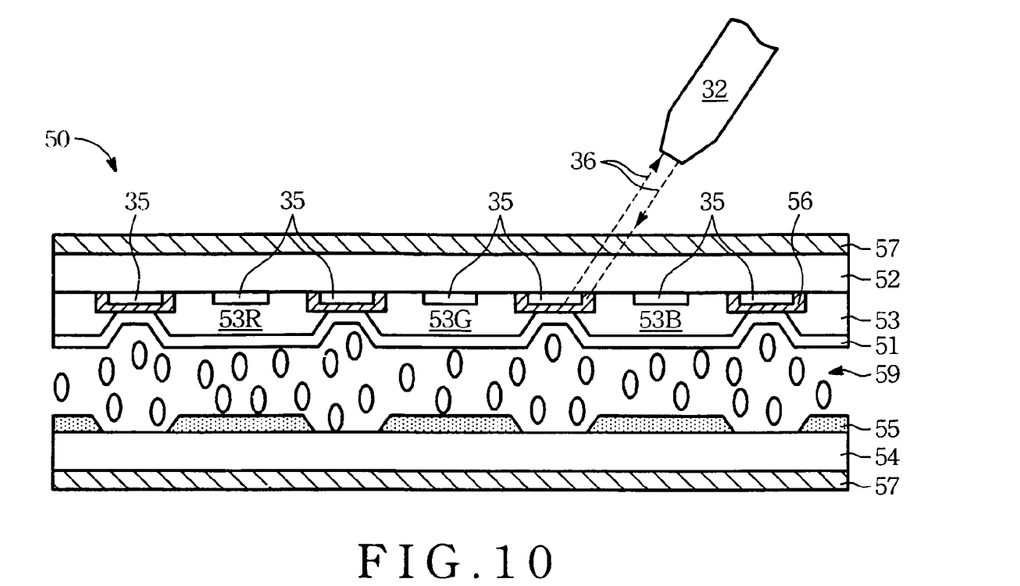
FIG. 10 shows a cross section view of a handwriting input apparatus according to another present embodiment, wherein the handwriting input apparatus is jointed with a LCD.

Please refer to FIG. 10. The embodiment illustrated with FIG. 10 is similar with the previous embodiment according to FIG. 9. The position-encoding layer 35 is disposed on the bottom surface of the first substrate 52, where is within the display panel 50. The difference is: the position-encoding layer 35 not only dispose in the predetermined area within the black matrix 56. It is disposed on the other area of the bottom surface of the first substrate 52, even within the scope of the color filter layer 53. Though this disposed positions may slightly influence the image light from the display panel 50, the high transmittance property of the position-encoding layer 35 can keep the display panel 50 still work in a reliable display quality.

Figure 11:
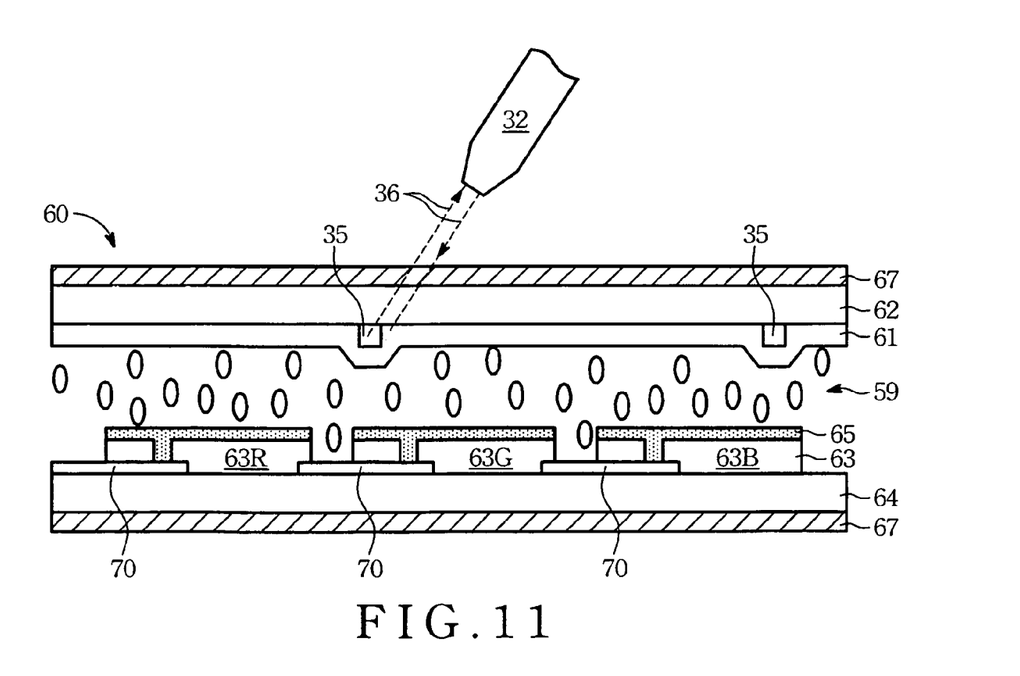
FIG. 11 shows a cross section view of a handwriting input apparatus according to another present embodiment, wherein the handwriting input apparatus is jointed with a COA type LCD.

Please refer to FIG. 11. In this embodiment, the position-encoding layer 35 is disposed in a display panel 60 such as a COA (color filter on array) type LCD. The display panel 60 comprises a first substrate 62, a second substrate 64 and a liquid crystal layer 59 disposed between Polarizers 67 are disposed on a top surface of the first substrate 62 and a bottom surface of the second substrate 64 respectively. A common electrode 61, which comprises conductive transparent material such ITO or IZO, is disposed on a bottom surface of the first substrate 62.

A plurality of thin-film transistors 70 arranged as an array are disposed on a top surface of the second substrate 64. A color filter layer 63, which comprises a plurality of red filters 63R, green filters 63G and blue filters 63B, is also disposed on the top surface of the second substrate 64. Each of the red filters 63R, the green filters 63G and the blue filters 63B is separated with each other and belongs to a respective thin-film transistor 70. A plurality of pixel electrode 65 is disposed on the color filter layer 63. Each pixel electrode 65 electrically connecting to a respective thin-film transistor 70 is disposed on a respective red filter 63R, green filter 63G or blue filter 63B.

In this COA type LCD, the position-encoding layer 35 is disposed on the bottom surface of the first substrate 62 and between the first substrate 62 and the common electrode 61. Comparing to the embodiments according to FIG. 3, the transparent substrate 34 in FIG. 3 is replaced with the first substrate 62. Therefore, the position-encoding layer 35 is able to be disposed within the display panel 60.

According to the present invention, a handwriting input apparatus of high resolution and high detecting speed is provided. The present handwriting input apparatus is able to apply in an electrical device or apply on a display panel. The convenient of fabricating the present handwriting input apparatus with mentioned electrical device or display panel is remarkable.

Referring to the described prior arts, no matter the touch panel 10 or the handwriting panel 20 encounters problem of supporting ability. In these prior arts, taking the prior art according to FIG. 1 for example, the handwriting input is detected by electrically connecting the conductive sheet 12 with the elastic conductive film 16, so as to generate a signal corresponding to the input. Hence, all of these priors need a spacer (19 or 29) to supporting the elastic conductive film (16 or 28). These prior handwriting input apparatus such as touch panel 10 or handwriting panel 20 both have a drawback of short life time because of the repeatedly use toward the elastic conductive film (16 or 28). And another common problem is that the flatness of the elastic conductive film (16 or 28) is not easy to control while manufacturing. The flatness problem would defeat the display quality of the display panel, which is jointed with these prior handwriting apparatus.

Comparatively, the present handwriting input apparatus detects the handwriting input by optical signals (the captured images of the position-encoding patterns). In other words, the present handwriting input apparatus does not need a real "touch" while operating. As a result, no spacer is needed in the present invention. Accordingly, the present handwriting input apparatus has a much more solid structure that the prior arts. This makes the present handwriting input apparatus a product of remarkable long life time.

In the other hand, the elastic conduct film, which has a flatness problem, is also no more needed in the present invention. Hence, the flatness problem of prior arts is currently removed. Further more, the influence, which is aroused by the present handwriting input apparatus, toward the display quality of the jointed display panel is well concerned among all of the present embodiments. Thus, the present invention is much more applicable on a display panel than prior arts.

As to the concern of cost, the present invention is much more economic than the prior handwriting panel 20. While the present handwriting input apparatus is able to provide remarkable resolution and detecting speed as or higher than the prior hand writing panel 20, it costs much less than the prior art. The hand writing panel 20 comprises a plurality of thin-film transistors, which are generally a kind of expansive element and cost more while demanding high resolution. Comparing to the handwriting panel 20, the present invention, which utilizes sputtering process to form the multi-layer structure of the position-encoding layer, costs much less. Although the cost is less, the position-encoding patterns, especially the 2-D barcodes, can provide very high detecting resolution. And its remaining resolution even if enlarging the position-encoding pattern's scale is another benefit of the present invention.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

We claim:

1. A LCD panel with handwriting input apparatus comprising:
    a first substrate;
    a plurality of position-encoding pattern disposed on a bottom surface of the first substrate, the position-encoding patterns being transparent to visible light and being reflective to light of predetermined wavelengths, each position-encoding pattern representing a specific code and having a multi-layer structure including alternate low-refractive-index layers formed of Mb2O5 and high-refractive-index layers formed of SiO2;
    a black matrix disposed on the bottom surface of the first substrate, wherein each position-encoding pattern is interposed between the black matrix and the first substrate and is completely covered by the black matrix;
    a color filter layer disposed on the bottom surface of the first substrate;
    a second substrate formed with thin-film transistors and pixel electrodes thereon, disposed beneath the first substrate and the color filter layer; and
    a liquid crystal layer interposed between the first substrate and the second substrate, thereby a pen having a projector and a camera at one end thereof is adapted to generate a light beam of the predetermined wavelengths through the first substrate toward the plurality of position-encoding pattern and the camera is adapted to capture images of the plurality of position-encoding pattern.

2. The LCD panel according to claim 1, wherein the bottom surface of the first substrate is formed with a roughness surface.

3. The LCD panel according to claim 1, wherein a part of the bottom surface of the first substrate is formed with a roughness surface for disposing the position-encoding patterns.

4. The LCD panel according to claim 1, further comprising a common electrode formed on the color filter layer and the black matrix.

5. The LCD panel according to claim 1, wherein the color filter layer includes red filters, green filters and blue filters, and each of the red filters, the green filters and the blue filters is separated with each other by the black matrix.

6. A LCD panel with handwriting input apparatus comprising:
    a first substrate;
    a plurality of position-encoding pattern disposed on a bottom surface of the first substrate, the position-encoding patterns being transparent to visible light and being reflective to light of predetermined wavelengths, each position-encoding pattern representing a specific code and having a multi-layer structure including alternate low-refractive-index layers formed of Mb2O5 and high-refractive-index layers formed of SiO2;
    a black matrix disposed on the bottom surface of the first substrate, wherein a part of the position-encoding patterns are interposed between the black matrix and the first substrate and the other part of the position-encoding patterns are interposed between the color filter layer and the first substrate;
    a color filter layer disposed on the bottom surface of the first substrate;
    a second substrate formed with thin-film transistors and pixel electrodes thereon, disposed beneath the first substrate and the color filter layer; and
    a liquid crystal layer interposed between the first substrate and the second substrate, thereby a pen having a projector and a camera at one end thereof is adapted to generate a light beam of the predetermined wavelengths through the first substrate toward the plurality of position-encoding pattern and the camera is adapted to capture images of the plurality of position-encoding pattern.

* * * * *